United States Patent
Beagen et al.

(10) Patent No.: US 11,125,359 B2
(45) Date of Patent: Sep. 21, 2021

(54) METHOD FOR MOUNTING A SUPPORT ASSEMBLY

(71) Applicant: Anvil International, LLC, Exeter, NH (US)

(72) Inventors: Joseph Beagen, North Attleboro, MA (US); Odair Dafonseca, Pawtucket, RI (US); William Tyler Howe, Worcester, MA (US)

(73) Assignee: ASC Engineered Solutions, LLC, Exeter, NH (US)

( * ) Notice: Subject to any disclaimer, the term of this patent is extended or adjusted under 35 U.S.C. 154(b) by 0 days.

(21) Appl. No.: 16/733,799

(22) Filed: Jan. 3, 2020

(65) Prior Publication Data

US 2020/0155884 A1  May 21, 2020

Related U.S. Application Data

(63) Continuation of application No. 15/903,482, filed on Feb. 23, 2018, now Pat. No. 10,561,873.

(51) Int. Cl.
*F16L 3/24* (2006.01)
*A62C 35/68* (2006.01)
*E04B 9/00* (2006.01)
*E04B 9/20* (2006.01)
*A62C 31/28* (2006.01)
*E04B 9/12* (2006.01)

(52) U.S. Cl.
CPC ............. *F16L 3/24* (2013.01); *A62C 31/28* (2013.01); *A62C 35/68* (2013.01); *E04B 9/006* (2013.01); *E04B 9/127* (2013.01); *E04B 9/20* (2013.01)

(58) Field of Classification Search
CPC . A62C 35/68; A62C 31/28; F16L 3/24; F16L 3/245; F16M 13/027; E04B 9/006; E04B 9/127; E04B 9/20; B05B 15/60; F16B 2/10; F16B 2/065; F16B 2/241
USPC .......................................... 169/51; 248/200.1
See application file for complete search history.

(56) References Cited

U.S. PATENT DOCUMENTS

| | | |
|---|---|---|
| 6,260,810 B1 | 7/2001 | Choi |
| 6,554,231 B2 | 4/2003 | Choi |
| 6,811,130 B1 | 11/2004 | Oh |
| 7,234,674 B2 | 6/2007 | Rippel et al. |
| 7,240,884 B2 | 7/2007 | Shim |

(Continued)

FOREIGN PATENT DOCUMENTS

WO   2019164717   8/2019

OTHER PUBLICATIONS

Beagen, Joseph; Non-Final Office Action for U.S. Appl. No. 15/903,482, filed Feb. 23, 2018, dated May 24, 2019, 23 pgs.

(Continued)

*Primary Examiner* — Ingrid M Weinhold
(74) *Attorney, Agent, or Firm* — Taylor English Duma LLP

(57) ABSTRACT

A method for mounting a support assembly to a ceiling support structure is disclosed. In example aspects, the method can comprise providing the support assembly, the support assembly comprising a bracket assembly, the bracket assembly comprising a first plate, a second plate, and a seating frame; positioning the seating frame in an open position; positioning a portion of the ceiling support structure within a space defined between the first and second plates; and securing the bracket assembly to the ceiling support structure.

12 Claims, 6 Drawing Sheets

FIG. 1

(56) References Cited

U.S. PATENT DOCUMENTS

| | | |
|---|---|---|
| 7,427,051 B2 | 9/2008 | Oh |
| 7,621,493 B2 | 11/2009 | Vermette et al. |
| 7,735,787 B2 | 6/2010 | Kafenshtok et al. |
| 7,735,794 B1 | 6/2010 | Gretz |
| 8,109,482 B2 | 2/2012 | Oh |
| 8,413,734 B2 | 4/2013 | Silcox et al. |
| 8,500,079 B2 * | 8/2013 | Oh .................. F16L 3/245 248/343 |
| 8,820,686 B2 | 9/2014 | Hickle et al. |
| 8,833,718 B2 * | 9/2014 | Oh .................. F16L 3/245 248/343 |
| 8,833,719 B2 | 9/2014 | Lim |
| 9,004,421 B2 | 4/2015 | Feenstra |
| 9,004,422 B2 | 4/2015 | Feenstra |
| 9,068,689 B2 | 6/2015 | Hickle et al. |
| 9,174,077 B2 | 11/2015 | Lim |
| 9,526,934 B2 | 12/2016 | Jung |
| 9,534,622 B2 | 1/2017 | Jung |
| 9,718,076 B2 * | 8/2017 | Oh .................. F16B 2/10 |
| 10,561,873 B2 | 2/2020 | Beagen et al. |
| 2002/0066834 A1 | 6/2002 | Choi |
| 2005/0139743 A1 | 6/2005 | Shim |
| 2006/0261235 A1 | 11/2006 | Rippel et al. |
| 2008/0099640 A1 | 5/2008 | Kafenshtok et al. |
| 2010/0276558 A1 | 11/2010 | Faust et al. |
| 2011/0094760 A1 | 4/2011 | Im |
| 2011/0260012 A1 * | 10/2011 | Oh .................. F16L 3/245 248/89 |
| 2011/0315409 A1 | 12/2011 | Silcox et al. |
| 2012/0097406 A1 * | 4/2012 | Silcox ............ E04B 9/006 169/51 |
| 2013/0105641 A1 | 5/2013 | Feenstra et al. |
| 2013/0220649 A1 | 8/2013 | Silcox et al. |
| 2013/0284862 A1 | 10/2013 | Lim |
| 2013/0291461 A1 * | 11/2013 | Oh .................. A62C 35/68 52/220.6 |
| 2014/0117188 A1 | 5/2014 | Wronski |
| 2015/0060613 A1 | 3/2015 | Lim |
| 2016/0023028 A1 | 1/2016 | Jung |
| 2016/0199680 A1 | 7/2016 | Jung et al. |
| 2016/0296778 A1 | 10/2016 | Seo et al. |
| 2017/0197101 A1 | 7/2017 | Chong |
| 2018/0100527 A1 | 4/2018 | Dafonseca et al. |
| 2018/0100607 A1 | 4/2018 | Dafonseca et al. |
| 2019/0262644 A1 | 8/2019 | Beagen et al. |

OTHER PUBLICATIONS

Beagen, Joseph; Notice of Allowance for U.S. Appl. No. 15/903,482, filed Feb. 23, 2018, dated Oct. 8, 2019, 16 pgs.

Beagen, Joseph; International Search Report and Written Opinion for PCT Application No. PCT/US19/17771, filed Feb. 13, 2019, dated Apr. 23, 2019, 11 pgs.

Beagen, Joseph; International Preliminary Report on Patentability for PCT Application No. PCT/US19/17771, filed Feb. 13, 2019, dated Sep. 3, 2020, 9 pgs.

* cited by examiner

METHOD FOR MOUNTING A SUPPORT ASSEMBLY

CROSS-REFERENCE TO RELATED APPLICATIONS

The present application is a continuation of U.S. application Ser. No. 15/903,482, filed Feb. 23, 2018, which is hereby specifically incorporated by reference herein in its entirety.

BACKGROUND OF THE DISCLOSURE

Field of the Disclosure

The present disclosure relates to fire protection sprinkler drop support systems and, more particularly, to an angled bracket for a fire sprinkler support assembly.

Discussion of Related Art

A typical automatic fire sprinkler system includes a network of pipes that carry a fire suppression fluid, e.g., water, to one or more rooms in a building. Conduit sections carry the fluid from the pipes to sprinkler heads strategically located in different rooms. The position and orientation of each sprinkler head is typically maintained in place by a support assembly. When the room reaches an elevated temperature due to a fire, the sprinkler head is activated, allowing a stream of fire suppression fluid to be directed over the intended area of coverage. During operation, the fluid pressure at the sprinkler head can reach as high as 175 psi, generating significant back pressure on the sprinkler support system. The support assembly is used to hold the sprinkler securely in place during operation.

Some known sprinkler support assemblies are designed to be secured to a ceiling structure by fasteners such as screws or bolts, which must be tightened using special tools in a time consuming process. In grid-type ceiling systems, the sprinkler head typically extends through an opening in a central area of one or more ceiling tiles. Grid-type ceiling systems offer a limited amount of space between the ceiling tiles and the inner structure of the ceiling. Some conventional approaches attempt to address this by providing leg brackets that are offset with respect to the support member of the ceiling grid. However, this approach provides a weak point at the bend in the leg, which is prone to failure.

SUMMARY OF THE DISCLOSURE

In view of the foregoing, there is a need in the art for a bracket for coupling a fire sprinkler support assembly to a beam of a ceiling grid system, wherein the bracket has sufficient clearance to allow the installation of ceiling tiles after a flexible drop is installed.

A method for mounting a support assembly to a ceiling support structure is disclosed, the method comprising providing the support assembly, the support assembly comprising a bracket assembly, the bracket assembly comprising a first plate, a second plate, and a seating frame; positioning the seating frame in an open position; positioning a portion of the ceiling support structure within a space defined between the first and second plates; and securing the bracket assembly to the ceiling support structure.

In some embodiments, a fire sprinkler support assembly may include a bracket bar operable to extend transverse to a beam, and a bracket assembly coupled to at least one end of the bracket bar. The bracket assembly may include a set of plates extending from an upper wall, the set of plates having a first end coupled to the bracket bar and a second end opposite the first end. An interior angle between the set of plates and the bracket bar may be less than 90 degrees. The bracket assembly may further include a seating frame extending from the second end of the set of plates, the seating frame including a first member and a second member disposed on opposite sides of the beam such that the first member and the second member straddle the beam. The bracket assembly may further include a fastener directly coupling the bracket assembly to the bracket bar.

In some embodiments, a fire sprinkler support assembly may include a bracket bar operable to extend transverse to a beam, and a bracket assembly coupled to at least one end of the bracket bar. The bracket assembly may include an upper wall, and an inner plate and an outer plate extending from opposite sides of the upper wall. The inner plate and the outer plate may have a first end coupled to the bracket bar and a second end opposite the first end, wherein an interior angle between the bracket bar and the inner plate is less than 90 degrees. The bracket assembly may further include a seating frame extending from the second end of the inner plate and the outer plate, the seating frame including a first member and a second member disposed on opposite sides of the beam such that the first member and the second member straddle the beam. The bracket assembly may further include a fastener extending through an opening in the upper wall, the fastener operable to engage the bracket bar.

In some embodiments, a bracket assembly coupled to at least one end of a bracket bar may include an inner plate and an outer plate extending from opposite sides of an upper wall, the inner plate and the outer plate each having a first end coupled to the bracket bar and a second end opposite the first end, wherein an interior angle between the bracket bar and the inner plate is less than 90 degrees. The bracket assembly may further include a seating frame including a first member extending from the second end of the inner plate, and a second member extending from the second end of the outer plate, wherein the first and second members are disposed on opposite sides of a beam such that the first member and the second member straddle the beam. The second member may include a plurality of arms extending over an upper rim of the beam, the arms spaced apart from one another on opposite sides of the first member. The bracket assembly may further include a fastener extending through an opening in the upper wall, the fastener operable to engage the bracket bar.

BRIEF DESCRIPTION OF THE DRAWINGS

The accompanying drawings illustrate exemplary approaches of the disclosure, including the practical application of the principles thereof, and in which.

Figure 1:
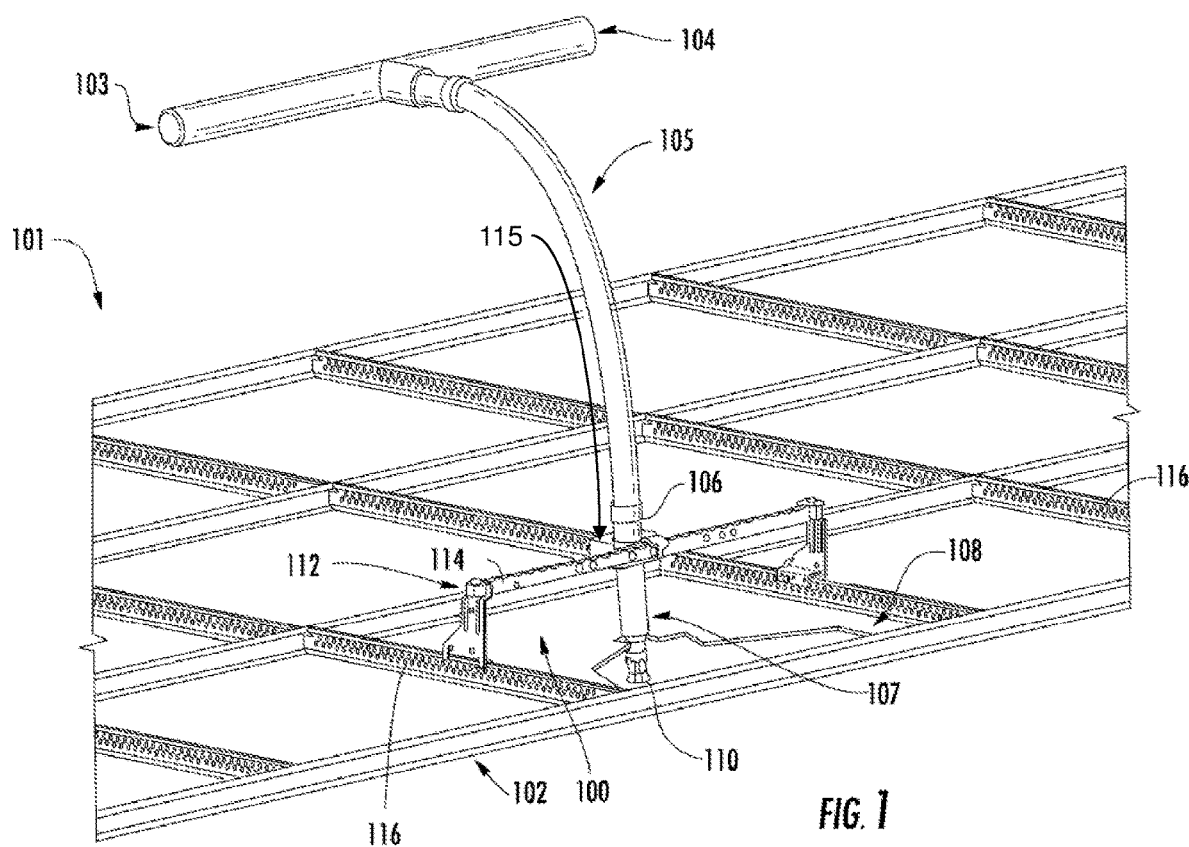
FIG. 1 is a perspective view of a fire sprinkler support assembly mounted within a ceiling according to exemplary approaches of the disclosure.

The drawings are not necessarily to scale. The drawings are merely representations, not intended to portray specific parameters of the disclosure. Furthermore, the drawings are intended to depict exemplary embodiments of the disclosure, and therefore is not considered as limiting in scope.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

The present disclosure will now proceed with reference to the accompanying drawings, in which various approaches are shown. It will be appreciated, however, that the disclosed angled bracket and fire sprinkler support assembly may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

As used herein, an element or operation recited in the singular and proceeded with the word "a" or "an" should be understood as not excluding plural elements or operations, unless such exclusion is explicitly recited. Furthermore, references to "one approach" of the present disclosure are not intended to be interpreted as excluding the existence of additional approaches that also incorporate the recited features.

Furthermore, spatially relative terms, such as "beneath," "below," "lower," "central," "above," "upper," and the like, may be used herein for ease of describing one element's relationship to another element(s) as illustrated in the figures. It will be understood that the spatially relative terms may encompass different orientations of the device in use or operation in addition to the orientation depicted in the figures.

As stated above, exemplary approaches herein provide a snap-to-grid angled bracket and bracket assembly for use with a fire suppression device. In one approach, a support assembly includes a bracket bar extending transverse to a beam, and a bracket assembly coupled to the bracket bar. The bracket assembly may include an upper wall and a set of plates extending from the upper wall, wherein the set of plates have a first end coupled to the bracket bar. An interior angle between the set of plates and the bracket bar is less than 90 degrees (e.g., 80-85°). The bracket assembly may further include a seating frame extending from a second end of the set of plates, the seating frame including a first member and a second member disposed on opposite sides of the beam such that the first member and the second member straddle the beam. The fire sprinkler support assembly may further include a fastener extending through an opening of the upper wall to couple the set of plates to the bracket bar.

Exemplary embodiments of brackets/brackets for fire sprinkler support assemblies described herein may be designed for a T-bar suspended beam of a grid support system. When installing the bracket assembly onto T-bar body, users can "snap" the bracket assembly onto the T-bar beam. Once the bracket assembly is positioned in place, the user can further secure/anchor the bracket assembly to the T-bar beam using one or more fasteners, which will bias the seating frame together on the T-bar beam. To un-anchor the bracket assembly from the T-bar beam, the user may disengage/loosen/release the fastener to unlock the seating frame from the T-bar beam.

Figure 2:
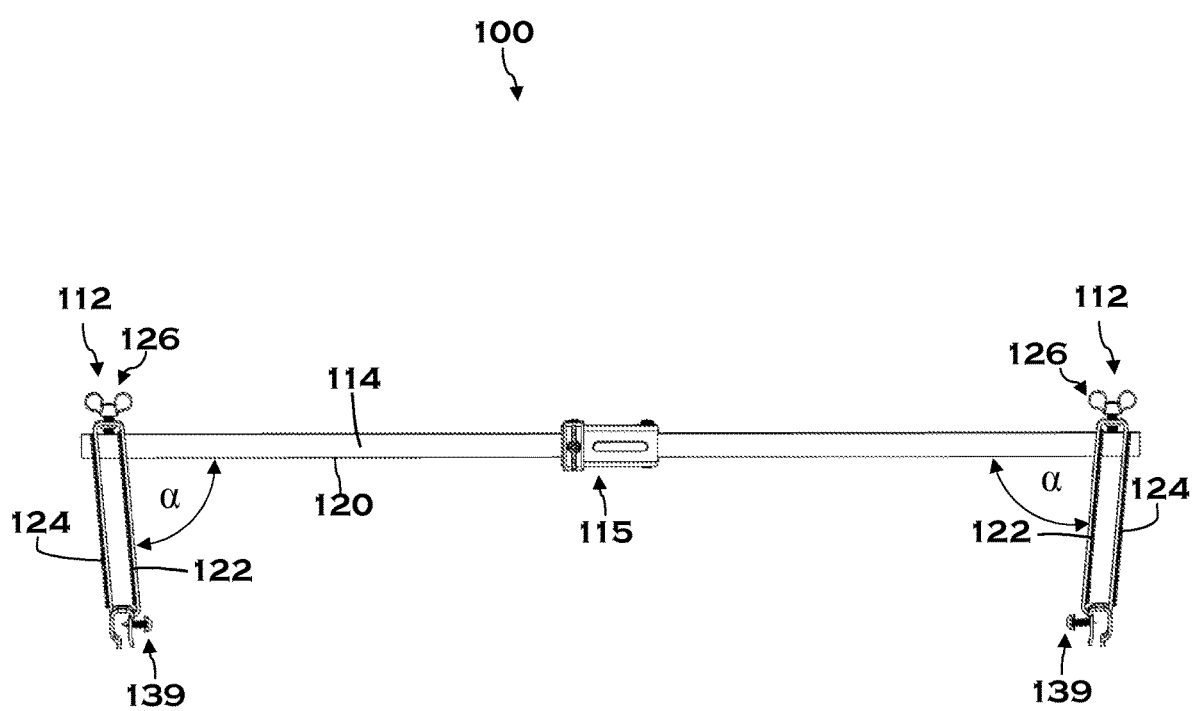
FIG. 2 is a side view of the fire sprinkler support assembly of FIG. 1 according to exemplary approaches of the disclosure.

FIGS. 1-2 show a fire sprinkler support assembly (hereinafter "support assembly") 100 mountable within a ceiling 101 having a ceiling frame 102 of rectangular frame sections arranged in a grid pattern. In some embodiments the ceiling frame 102 may be a suspended ceiling. A fire sprinkler system 103 can include supply pipes 104 as part of a fire suppression fluid delivery system. The fire sprinkler system 103 can also include a flexible hose 105, which can couple, via a union nut 106, to the sprinkler drop 107. A ceiling panel 108 may be positioned within a section of the ceiling frame 102, and a sprinkler head 110 may be coupled to a distal end of the sprinkler drop 107, below an opening in the ceiling panel 108. During operation, in the event of a fire, a thermally responsive device of the sprinkler head 110 reacts to heat generated by the fire to allow fluid (e.g., water, nitrogen, and/or halogen) to flow through the sprinkler drop 107 and into the sprinkler head 110, where the fluid is dispersed outwardly to extinguish the fire. In order to protect the room from fire, the support assembly is most commonly located above the ceiling panel 108, but can also reside in a floor or in one or more walls of a building structure.

The support assembly 100 may secure the sprinkler head 110 at a predetermined position within an associated one of ceiling panels 108. In order to function effectively, fire sprinkler head 110 must be held firmly in place during operation. Due to the significant back pressure of the fluid flowing therethrough, fire sprinkler head 110 is subjected to significant side, rotational, and torsional forces, which are capable of changing the position of the fire sprinkler head 110, thereby causing the fluid to be directed away from the intended target. The sprinkler support assembly 100 is configured to resist movement of fire sprinkler head 110 by distributing the forces to spaced-apart points along beams 116, which are arranged as a grid.

The support assembly 100 further includes a bracket assembly 112 coupled to at least one end of a bracket bar 114, which in turn is coupled to the flexible hose 105 by a hub connector 115. In exemplary embodiments, a pair of bracket assemblies 112 are disposed on opposite ends of the bracket bar, e.g., as shown. The bracket assemblies 112 connect to each of a pair of adjacent beams 116 of the ceiling frame 102. In one embodiment, each of the beams may be a t-shaped beam (i.e., a T-bar) suspended from an overlying building structure using, for example, flexible wire, and may be configured according to ASTM International standards. The standards may include, but are not limited to, those set forth in one or more of designations C635, C636 and E580, which are each incorporated herein by reference.

As shown in FIG. 2, each bracket assembly 112 is an angled bracket. That is, an interior angle α between the bracket assembly 112 and the bracket bar 114 is less than 90 degrees. In some embodiments, the interior angle α is measured between an underside 120 of the bracket bar 114 and a set of plates, such as an inner plate 122 and an outer plate 124 of each bracket assembly 112. Although not limited to any specific angle, the interior angle α may be between 80-85° in various embodiments. Advantageously, by tilting the inner plate 122 and the outer plate 124 outwardly, e.g., by approximately 5°, the diagonal space from top inner corner of an intersection of the inner plate 122 and the outer plate 124 and the bracket bar 114 may be greater than 0.6096 meters (i.e., 24"), thus allowing a standard 0.6096 (i.e., 24") ceiling tile to be installed after the flexible drop 107 (FIG. 1) is installed.

In some embodiments, the bracket assemblies 112 include a fastener 126 coupling the inner plate 122 and the outer plate 124 to the bracket bar 114. The fasteners 126 may extend through an opening in an upper wall 130 for impact with the bracket bar 114. In some embodiments, the fasteners 126 may further extend through an opening in the bracket bar 114. Although non-limiting, the fasteners 126 may include a wing nut operable with a screw or bolt. A second fastener 139 (e.g., a screw) may be provided through either of the inner plate 122 and the outer plate 124 for engagement with the beam. In the non-limiting embodiment shown, the second fastener 139 is coupled to the inner plate 122.

Figure 3:
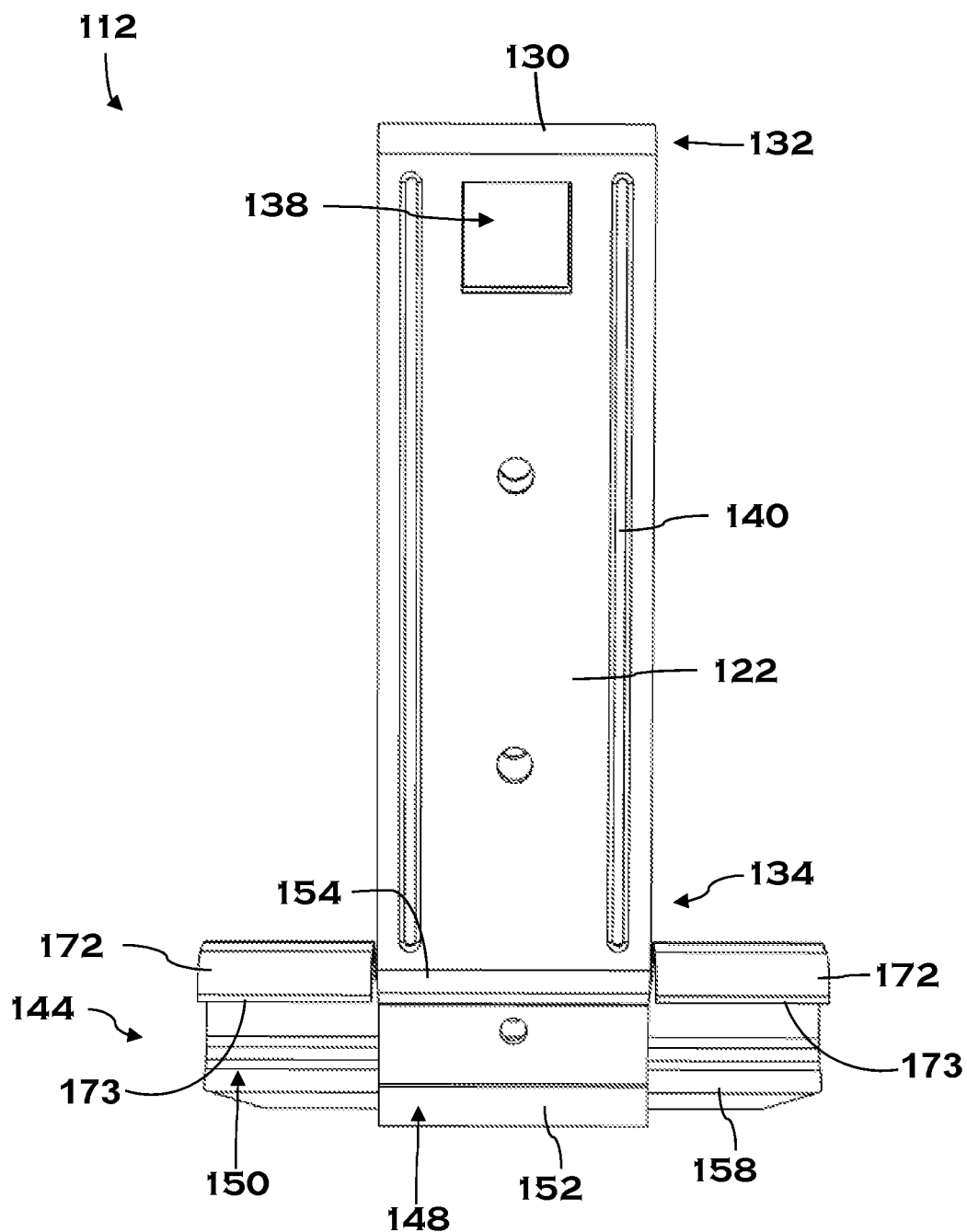
FIG. 3 is a first end view of a bracket of the fire sprinkler support assembly of FIG. 2 according to exemplary approaches of the disclosure.
Figure 4:
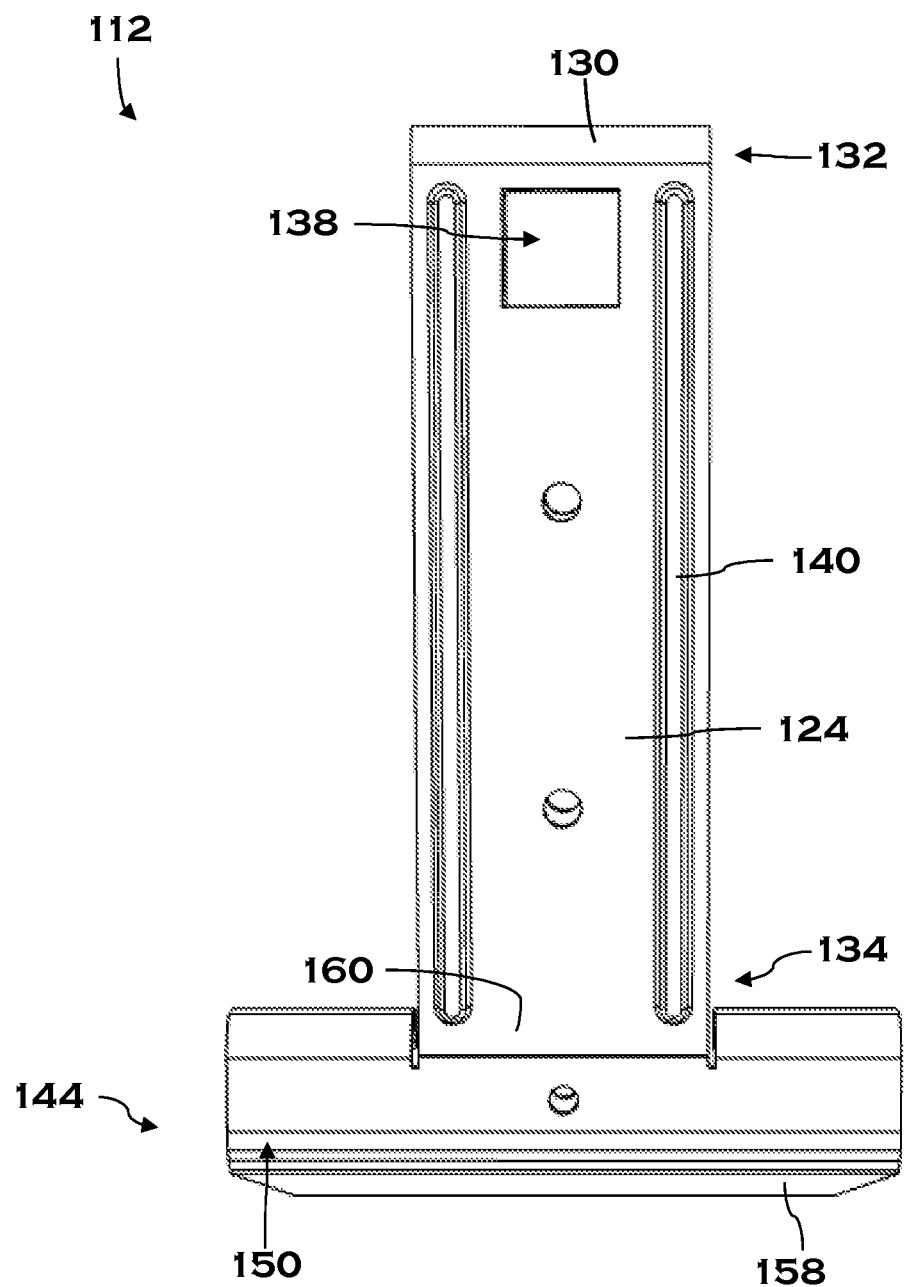
FIG. 4 is a second end view of the bracket of the fire sprinkler support assembly of FIG. 2 according to exemplary approaches of the disclosure.
Figure 5:
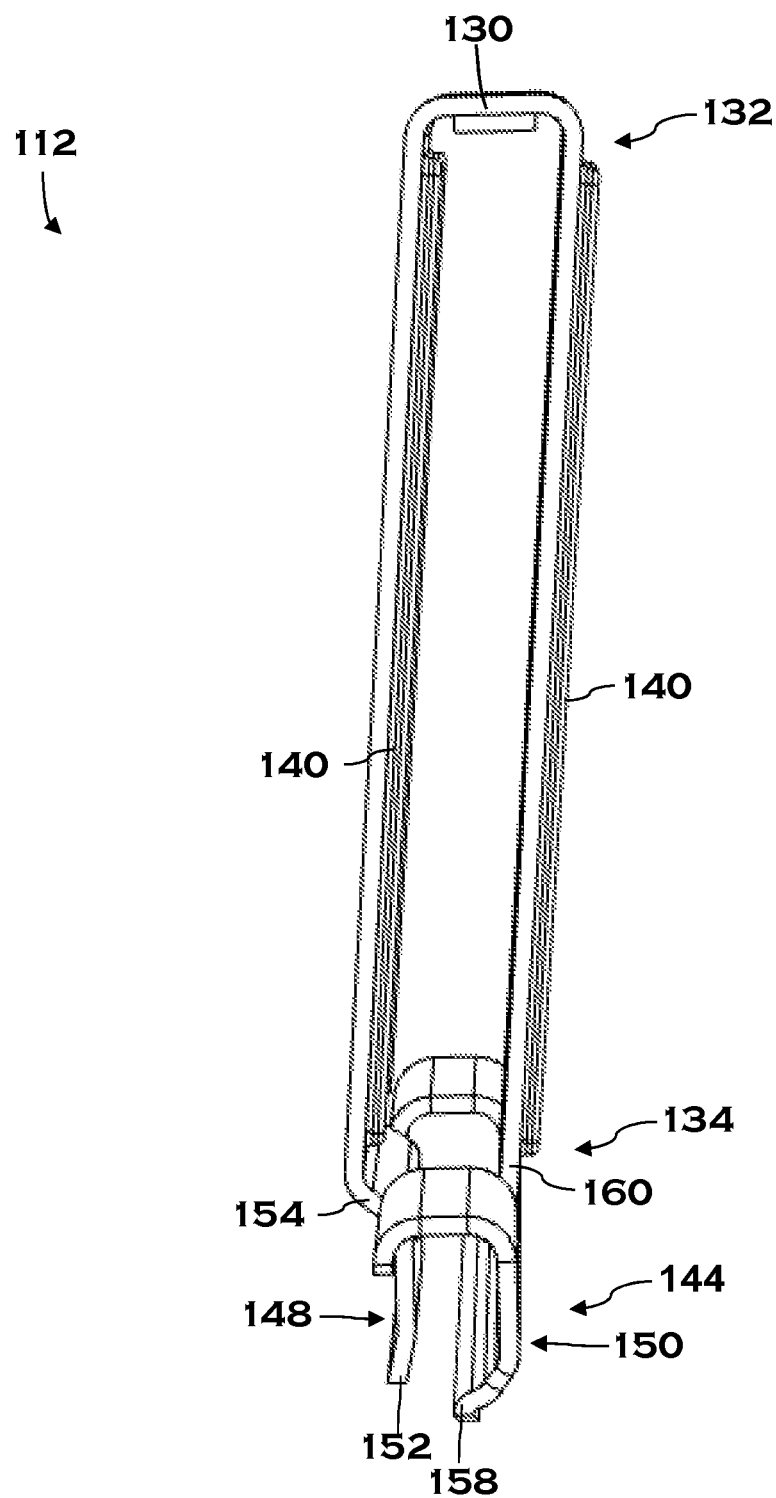
FIG. 5 is a side view of the bracket of the fire sprinkler support assembly of FIG. 2 according to exemplary approaches of the disclosure.

Turning now to FIGS. 3-5, a non-limiting bracket assembly 112 according to embodiments of the present disclosure will be described in greater detail. The bracket assembly 112 may include the upper wall 130 having an opening provided therein to receive the fastener 126 (FIG. 2). The inner plate 122 and the outer plate 124 extend from the upper wall 130 at an acute angle relative to the bracket bar 114, as described above. In some embodiments, the inner plate 122 and the outer plate 124 are oriented parallel to one another. As further shown, the inner plate 122 and the outer plate 124 may have a first end 132 coupleable to the bracket bar 114, and a second end 134, opposite the first end 132. An opening 138 may be provided through each of the inner plate 122 and the outer plate 124 for receiving the bracket bar 114 therethrough. As such, the upper wall 130 is configured to extend over the bracket bar 114 once assembled. One or more stiffening ridges 140 may be provided along each of the inner plate 122 and the outer plate 124.

The bracket assembly 112 may further include a seating frame 144 extending from the second end 134 of the inner plate 122 and the outer plate 124. The seating frame 144 may include a first member 148 and a second member 150 disposed on opposite sides of the beam such that the first member 148 and the second member 150 straddle the beam. As shown, the first member 148 may include a first free end 152 and a first fixed end 154. The first fixed end 154 may be integrally coupled with and extend from the inner plate 122. As further shown, the second member 150 may include a second free end 158 and a second fixed end 160. The second fixed end 160 may be integrally coupled with and extend from the outer plate 124.

Figure 6:
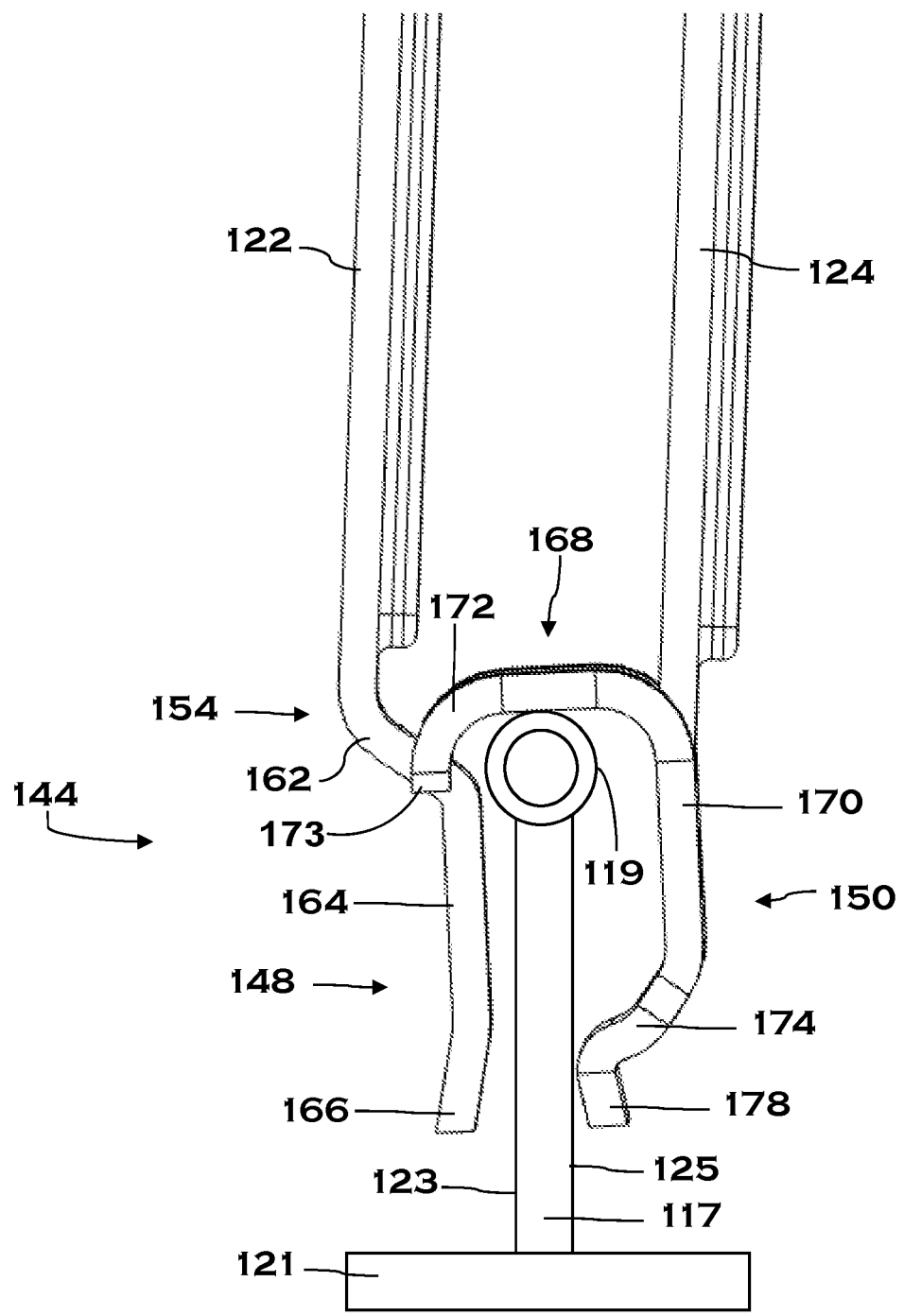
FIG. 6 is a partial side view of the bracket of fire sprinkler support assembly mounted atop a beam according to exemplary approaches of the disclosure.

Turning now to FIG. 6, the seating frame 144 of the bracket assembly 112 according to embodiments of the present disclosure will be described in greater detail. The seating frame 144 is shown atop a t-shaped beam 116 including a flange 117, an upper rim 119, and a base 121. As shown, the first member 148, which extends from the inner plate 122, may include a first section 162 extending/bending towards the outer plate 124. The first section 162 may correspond to the first fixed end 154. Extending downwardly from the first section 162 is a second section 164, wherein the first section 162 and the second section 164 may be integrally coupled/formed together. In some embodiments, the second section 164 may be parallel, or substantially parallel, to the flange 117 of the beam 116. The second section 164 may be perpendicular, or substantially perpendicular, to the bracket bar (not shown) even though the inner plate 122 and the outer plate 124 are oriented at an angle relative to the bracket bar. This ensures that during use, the second section 164 may engage an inner surface 123 of the flange 117 to secure the first member 148 to the beam 116. As further shown, a third section 166 of the first member 148 may extend downwardly from the second section 164. In some embodiments, the third section 166 may extend at an angle away from the outer plate 124 and away from the beam 116 to permit the first member 148 to more easily slide past the upper rim 119 during installation.

As further shown, the second member 150 may include a first section 168 extending towards the inner plate 122, and a second section 170 extending downwardly from the first section 168. In some embodiments, the first section 168 includes one or more arms 172 extending over the upper rim 119 of the beam 116. The arms 172 may include a free end 173 extending past or partially past the first member 148. In some embodiments, the arms 172 may be spaced apart from one another, for example, on opposite sides of the first member 148, as shown in FIG. 3. Furthermore, the arms 172 be curved about the upper rim 119 to better secure the second member 150 to the beam 116.

The second section 170 may be integrally coupled/formed with the first section 168. In some embodiments, the second section 170 may be parallel, or substantially parallel to the flange 117 of the beam 116. The second section 170 may be perpendicular, or substantially perpendicular, to the bracket bar (not shown) even though the inner plate 122 and the outer plate 124 are oriented at an angle relative to the bracket bar.

The second member 150 may further include a third section 174 connected to the second section 170. As shown, the third section 174 may extend towards the inner plate 122 and towards the flange 117. During use, the third section 174 may engage an outer surface 125 of the flange 117 to secure the second member 150 to the beam 116. The second member 150 may further include a fourth section 178 connected to the third section 174, the fourth section 178 extending away from the inner plate 122 and away from the flange 117 to permit the second member 150 to more easily slide past the upper rim 119 during installation.

For each of the herein described embodiments, a non-limiting method of mounting the support assembly to a ceiling support structure (e.g., a beam) will now be described. First, with the seating frame of the bracket in the open position, the bracket assembly of the support assembly is fitted onto the corresponding beam(s). Fitting the bracket assembly onto the beam may include manually spreading the first and second plates apart to obtain adequate spacing to accept the upper rim and the flange of the beam. Next, when the support assembly is in the desired location about beam, the first fastener may be tightened to secure the upper wall of the bracket assembly to the bracket bar. The second fastener extending through one of the set of plates may also be tightened to secure the bracket assembly to the flange of the beam. To remove the support assembly, the first and second fasteners may again be actuated to an open position, and the bracket assembly may be lifted from the beam.

It will be appreciated that embodiments of the disclosure provide at least the following advantages. Firstly, by providing a bracket assembly having angled plates, users are able to first install the bracket assembly, followed by the ceiling tile, due to the high clearance afforded by the bracket assembly design. Secondly, the configuration of the seating frame allows the bracket assembly to "snap" to the beam, thus allowing the bracket to be installed faster, and potentially by hand, thus reducing tooling such as cordless drills and drivers. Thirdly, the brackets are designed to hold a sprinkler head firmly in place during operation by resisting side, rotational, and torsional forces, thus satisfying UL requirements for use in the fire protection industry.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

What is claimed is:

1. A method for mounting a support assembly to a ceiling support structure, the method comprising:
   providing the support assembly, the support assembly comprising a bracket assembly, the bracket assembly comprising an upper wall, a first plate, a second plate, and a seating frame extending from the first and second plates, the first plate extending from a first side of the upper wall, the second plate extending from a second side of the upper wall, the seating frame comprising a first member and a second member, the second member comprising a first section and a second section;
   positioning the seating frame in an open position;
   positioning a portion of the ceiling support structure between the first member and the second section of the second member, the first member extending along a first side of the ceiling support structure and the second section of the second member extending along a second side of the ceiling support structure, wherein the first section of the second member extends over the ceiling support structure, and wherein the first section comprises a pair of arms spaced apart on opposite sides of the first member, each of the arms extending over a top of the ceiling support structure and along the first side of the ceiling support structure opposite the second section, each of the arms defining a free end distal to the second section; and
   securing the bracket assembly to the ceiling support structure.

2. The method of claim 1, further comprising spreading the first and second plates of the bracket assembly apart to define a space therebetween.

3. The method of claim 2, wherein spreading the first and second plates apart is performed manually.

4. The method of claim 1, wherein the ceiling support structure is a beam.

5. The method of claim 4, wherein positioning a portion of the ceiling support structure between the first member and the second section of the second member comprises positioning an upper rim of the beam and a flange of the beam between the first member and the second section of the second member.

6. The method of claim 5 wherein securing the bracket assembly to the ceiling support structure comprises tightening a beam fastener to secure the bracket assembly to the flange of the beam.

7. The method of claim 1, wherein:
   the support assembly further comprising a bracket bar; and
   the method further comprises securing the bracket assembly to the bracket bar.

8. The method of claim 7, wherein securing the bracket assembly to the bracket bar comprises tightening a bracket bar fastener to secure the upper wall of the bracket assembly to the bracket bar.

9. The method of claim 7, wherein each of the first plate and second plate are oriented at an acute angle relative to the bracket bar.

10. The method of claim 1, wherein each of the free ends extend at least partially past the first member.

11. The method of claim 1, wherein each of the arms is curved around an upper rim of the ceiling support structure.

12. The method of claim 2, wherein spreading the first and second plates of the bracket assembly apart to define a space therebetween comprises at least one of bending the first plate relative to the upper wall and bending the second plate relative to the upper wall.

* * * * *